(12) United States Patent
Frederic et al.

(10) Patent No.: US 12,110,865 B2
(45) Date of Patent: Oct. 8, 2024

(54) METHOD FOR CONTROLLING A RAMP RATE OF A WIND PARK WITH A PLURALITY OF WIND TURBINES AND WIND PARK

(71) Applicant: General Electric Renovables Espana, S.L., Barcelona (ES)

(72) Inventors: Evelyn Rose Frederic, Greenville, SC (US); Ubaid Rahim, Greenville, SC (US); Hailey York, Greenville, SC (US)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/328,205

(22) Filed: Jun. 2, 2023

(65) Prior Publication Data

US 2023/0392580 A1    Dec. 7, 2023

(30) Foreign Application Priority Data

Jun. 7, 2022 (EP) .................................... 22177596

(51) Int. Cl.
*F03D 7/02* (2006.01)
*F03D 7/04* (2006.01)
*H02P 9/10* (2006.01)

(52) U.S. Cl.
CPC ............. *F03D 7/028* (2013.01); *F03D 7/048* (2013.01); *H02P 9/10* (2013.01);
(Continued)

(58) Field of Classification Search
CPC . F03D 7/028; F03D 7/048; H02P 9/10; F05B 2270/1033; F05B 2270/309; F05B 2270/32; F05B 2270/335; Y02E 10/72
See application file for complete search history.

(56) References Cited

U.S. PATENT DOCUMENTS

| | | | |
|---|---|---|---|
| 7,298,059 B2 * | 11/2007 | Delmerico | F03D 7/048 307/85 |
| 8,587,142 B2 * | 11/2013 | Kang | F03D 7/0284 700/286 |
| 8,912,674 B2 | 12/2014 | Ubben et al. | |

FOREIGN PATENT DOCUMENTS

| | | |
|---|---|---|
| EP | 1672778 A2 | 6/2006 |
| EP | 2487365 A1 | 8/2012 |

OTHER PUBLICATIONS

European Search Report Corresponding to EP22177596.8 filed on Dec. 6, 2022.

* cited by examiner

*Primary Examiner* — Pedro J Cuevas
(74) *Attorney, Agent, or Firm* — Dority & Manning, P.A.

(57) ABSTRACT

A method 100 for controlling a ramp rate of a wind park with a plurality of wind turbines, the method comprising:
determining 102 a generating pool of the wind park that includes wind turbines of the plurality of wind turbines that are online;
for each wind turbine in the generating pool, measuring and/or determining a first set of quantities of the wind turbine, the first set of quantities including at least an average wind speed value at the wind turbine;
based on the first set of quantities measured and/or determined for each wind turbine in the generating pool, determining a pre-shutdown pool that includes wind turbines of the generating pool for which the average wind speed value at the wind turbine exceeds a first wind speed threshold;
for each wind turbine in the pre-shutdown pool, measuring or determining a power of the wind turbine;
based on the power of the wind turbines in the pre-shutdown pool, computing 104 a total power of the pre-shutdown pool;
controlling the wind turbines of the generating pool of the wind park based on the total power of the pre-shutdown pool;

(Continued)

controlling the ramp rate of the wind park based at least in part on controlling the wind turbines of the generating pool of the wind park;

wherein the controlling of the wind turbines of the generating pool is configured to limit and/or reduce the absolute value of the time derivative of the total power generated by the wind park below a predetermined upper bound of the absolute value of the time derivative of the total power generated by the wind park.

11 Claims, 3 Drawing Sheets

(52) U.S. Cl.
CPC . *F05B 2270/1033* (2013.01); *F05B 2270/309* (2013.01); *F05B 2270/32* (2013.01); *F05B 2270/335* (2013.01)

METHOD FOR CONTROLLING A RAMP RATE OF A WIND PARK WITH A PLURALITY OF WIND TURBINES AND WIND PARK

TECHNICAL FIELD

The present disclosure relates to methods for controlling a ramp rate of a wind park with a plurality of wind turbines.

BACKGROUND

A wind park includes a plurality of wind turbines configured to generate electrical power.

The wind turbines convert kinetic energy of the wind into electric energy that is transferred to a grid and via the grid to electrical loads.

Depending on wind conditions and/or on conditions of the grid it may be necessary to shut down one or more of the wind turbines of the plurality of wind turbines in the wind park.

For example, in the presence of a storm, it may be necessary or recommended to shut down wind turbines in order to prevent a damage or a malfunctioning of the wind turbines in the wind park.

After the storm, the wind turbines may be restarted again.

During a shutdown and/or during a restart of wind turbines in the wind park the power delivered from wind turbines to the grid varies over time. For example, during a shutdown the power may reach the value of zero starting from a nonzero value and/or the time derivative of the power delivered to the grid may have an absolute value different from zero.

An absolute value of the time derivative of the power delivered to the grid should be low enough to maintain a balance between produced and consumed power and/or to maintain grid stability and/or a reliable operation of the wind park.

There is therefore a need to keep the absolute value of the time derivative of the power delivered to the grid below a threshold and/or to prevent an excessive rate of change in power per minute of the power output of the wind park, in particular during a storm shutdown or restart.

SUMMARY

The invention is defined by the independent claims. The dependent claims define further embodiments of the invention.

In one aspect the present disclosure is directed to a method for controlling a ramp rate of a wind park with a plurality of wind turbines, the method comprising:
  determining a generating pool of the wind park that includes wind turbines of the plurality of wind turbines that are online;
  for each wind turbine in the generating pool, measuring and/or determining a first set of quantities of the wind turbine, the first set of quantities including at least an average wind speed value at the wind turbine;
  based on the first set of quantities measured and/or determined for each wind turbine in the generating pool, determining a pre-shutdown pool that includes wind turbines of the generating pool for which the average wind speed value at the wind turbine exceeds a first wind speed threshold;
  for each wind turbine in the pre-shutdown pool, measuring or determining a power of the wind turbine;
  based on the power of the wind turbines in the pre-shutdown pool, computing a total power of the pre-shutdown pool;
  controlling the wind turbines of the generating pool of the wind park based at least in part on the total power of the pre-shutdown pool;
  controlling the ramp rate of the wind park based at least in part on controlling the wind turbines of the generating pool of the wind park;
  wherein the controlling of the wind turbines of the generating pool is configured to limit and/or reduce the absolute value of the time derivative of the total power generated by the wind park below a predetermined upper bound of the absolute value of the time derivative of the total power generated by the wind park.

In another aspect the present disclosure is directed to a method for controlling a wind park with a plurality of wind turbines, the method comprising:
  determining a set of online turbines of the wind park that includes wind turbines of the plurality of wind turbines that are online;
  for each wind turbine in the set of online turbines, measuring and/or determining a first set of quantities of the wind turbine, the first set of quantities including at least an average wind speed value at the wind turbine;
  based on the first set of quantities measured and/or determined for each wind turbine in the set of online turbines, determining a set of first threshold wind turbines that includes wind turbines of the set of online turbines for which the average wind speed value at the wind turbine exceeds a first wind speed threshold;
  for each wind turbine in the set of first threshold wind turbines, measuring or determining a power of the wind turbine;
  based on the power of the wind turbines in the set of first threshold wind turbines, computing a total power of the set of first threshold wind turbines;
  controlling the wind turbines of the set of online turbines of the wind park based at least in part on the total power of the set of first threshold wind turbines;
  controlling the wind turbines of the set of online turbines of the wind park;
  wherein the controlling of the wind turbines of the set of online turbines is configured to limit and/or reduce the absolute value of the time derivative of the total power generated by the wind park below a predetermined upper bound of the absolute value of the time derivative of the total power generated by the wind park.

DETAILED DESCRIPTION

The present disclosure prevents an excessively high rate of change in power per minute of a wind park power output due to storm shutdown/restart.

Based on 10 minute average values and a ranking score based on operational data from all machines in the wind park, the park controller sends a progressive storm shutdown flag to individual wind turbines prior to their normal storm shutdown A controlled shutdown may be initiated.

A time delay function initialized before the next progressive storm shutdown flag is send to another wind turbine ensures that the rate of change in power is guaranteed.

The restart of the wind turbines is dependent on the 10 minute average value being below the wind turbine restart wind speed after a storm and on a reset of the progressive storm shutdown flag from the park controller.

Based on the 10 minute average values and a ranking score based on operational data from all machines in the wind park, the park controller resets the progressive storm shutdown flag for the individual wind turbines.

The present disclosure provides a progressive storm shutdown handled via the park controller and ensures a compliant rate of change in power on wind park level due to storm shutdowns.

All wind turbine generators (WTGs) in a wind park are sharing a 10 min. average wind speed value, online status, actual and possible power, grid operating time and turbine storm shutdown status with the wind control system (WCS). The WCS defines a generating pool of all WTGs that are sending the online status. The WCS defines a first wind speed threshold that is less than the WTG based storm shutdown level. If a 10 min. average wind speed of at least one WTG exceeds the predefined first wind speed threshold the WTG enters a pre-shutdown pool. The power of all WTGs within the pre-shutdown pool is summed up. If the total power within the pre-shutdown pool is less than or equal to the allowed power drop, the WTG based storm shutdown logic is active only. If the total power is greater than the allowed power drop or greater than a pre-define power threshold a progressive storm shutdown logic on the WCS is initiated. The WCS defines a second wind speed threshold that is less than the WTG based storm shutdown level but greater than the first wind speed threshold. A third wind speed threshold is defined between the first and second wind speed threshold.

If the total power within the pre-shutdown pool is greater than the allowed power drop but less than the pre-defined power threshold the logic checks the highest wind speed within the pre-shutdown pool against the second wind speed threshold. If the output power is greater than the pre-defined power threshold the logic checks the highest wind speed against the third wind speed threshold. If the highest wind speed exceeds the given wind speed threshold, the WCS is following ranking criteria out of one or multiple WTG controller values, e.g. wind speed, actual power, grid operating time, etc.

The WCS checks the actual rate of change of power per minute against the allowed power drop. If the value is not exceeded the machine with the highest ranking score is receiving a progressive storm shutdown flag from the WCS to initiate a shutdown procedure. At the same time a time delay function is started. If the timer is elapsed the WCS evaluates the pre-shutdown pool against the total power, highest wind speed and ranking criteria again and sends a progressive shutdown flag to the next WTG. WTGs that are stopped are handled within an idling pool. To allow WTGs to re-start after a storm shutdown the WTG controller 10 min. average wind speed shall be less than a pre-defined restart wind speed after storm for a defined period and the progressive storm shutdown flag from the WCS shall be reset. The reset of the park progressive storm shutdown flag by the WCS is dependent on the WTG lowest average values out of the idling pool. If the 10 min. average wind speed value is less than a pre-define re-start wind speed, the WCS checks if the total possible power within the idling pool is greater than or equal to the allowed power increase.

The reset of the park progressive storm shutdown flag is following a ranking criterion out of one or multiple WTG controller values, e.g. wind speed, actual possible power, grid operating time, etc. The machine with the highest ranking score receives the reset of the park progressive storm shutdown flag from the WCS to allow the WTG re-start. At the same time a time delay function is started. If the timer is elapsed the WCS evaluates the idling pool against the lowest wind speed and highest ranking criterion again and initiates a reset of the park progressive shutdown flag for the next WTG.

Figure 1:
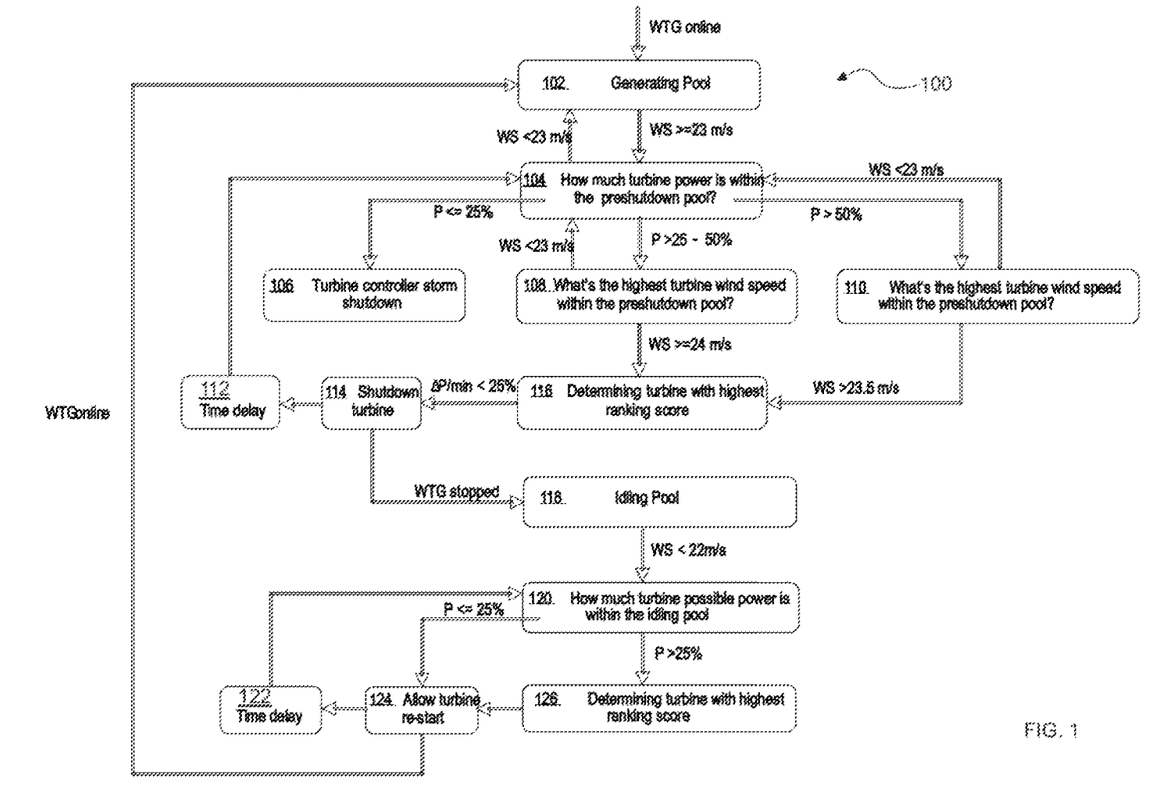
FIG. 1 shows a method for controlling a ramp rate of a wind park with a plurality of wind turbines according to the present disclosure.

FIG. 1 shows a method 100 for controlling a ramp rate of a wind park with a plurality of wind turbines according to the present disclosure.

The present disclosure provides a method 100 for controlling a ramp rate of a wind park with a plurality of wind turbines, the method comprising:

determining 102 a generating pool of the wind park that includes wind turbines of the plurality of wind turbines that are online;

for each wind turbine in the generating pool, measuring and/or determining a first set of quantities of the wind turbine, the first set of quantities including at least an average wind speed value at the wind turbine;

based on the first set of quantities measured and/or determined for each wind turbine in the generating pool, determining a pre-shutdown pool that includes wind turbines of the generating pool for which the average wind speed value at the wind turbine exceeds a first wind speed threshold;

for each wind turbine in the pre-shutdown pool, measuring or determining a power of the wind turbine;

based on the power of the wind turbines in the pre-shutdown pool, computing 104 a total power of the pre-shutdown pool;

controlling the wind turbines of the generating pool of the wind park based on the total power of the pre-shutdown pool;

controlling the ramp rate of the wind park based at least in part on controlling the wind turbines of the generating pool of the wind park;

wherein the controlling of the wind turbines of the generating pool is configured to limit and/or reduce the absolute value of the time derivative of the total power generated by the wind park below a predetermined upper bound of the absolute value of the time derivative of the total power generated by the wind park.

The first wind speed threshold may for example be 23 m/s, such that the wind speed value WS exceeds the first wind speed threshold if and only if WS>=23 m/s.

In some embodiments, controlling the wind turbines of the generating pool further comprises controlling the wind turbines of the generating pool using 106 a storm shutdown logic of the wind turbines when the total power P of the pre-shutdown pool is below an allowed power drop.

The allowed power drop may be for example 25% of a predefined maximum power value of the wind park.

In some embodiments, controlling the wind turbines of the generating pool further comprises:

determining if the total power of the pre-shutdown pool is above an allowed power drop and, when the total power of the pre-shutdown pool is above the allowed power drop, determining (108, 110) a highest wind speed within the pre-shutdown pool and, based on the total power of the pre-shutdown pool and the highest wind speed within the pre-shutdown pool, determining a shutdown ranking score for each wind turbine in the pre-shutdown pool and determining 116 the turbine in the pre-shutdown pool with the highest shutdown ranking score;

wherein the allowed power drop is based on the predetermined upper bound of the absolute value of the time derivative of the total power generated by the wind park.

For example, the highest shutdown ranking score may be determined based on a progressive shutdown condition, i.e. when a progressive shutdown condition becomes true.

In some embodiments, the progressive shutdown condition is satisfied (i.e. evaluates to true) when:

the total power P of the pre-shutdown pool is above a predefined power threshold (for example 50% of a predefined maximum power value of the wind park) and the highest wind speed within the pre-shutdown pool is above a third wind speed threshold (for example 23.5 m/s)

or the total power P of the pre-shutdown pool is greater than the allowed power drop (for example 25% of the predefined maximum power value of the wind park) and less than the predefined power threshold (for example 50% of the predefined maximum power value of the wind park) and the highest wind speed within the pre-shutdown pool is above a second wind speed threshold (for example 24 m/s in particular as exemplarily depicted in FIG. 1).

wherein the wind speeds are average wind speeds, for example 10 minute averages.

For each wind turbine, the shutdown ranking score may be calculated based on a shutdown factor. For example, the shutdown ranking score may be based on a wind speed margin to cutout and operation time. A shutdown ranking score of a wind turbine may be computed for example as $$0.9*(V_{act}/V_{cutout}) \pm 0.1*t_{operation}$$

with $V_{act}$ the actual speed of the wind turbine or an average speed (e.g. a 10 minute average) and $V_{cutout}$ the cutout speed and $t_{operation}$ the operation time of the wind turbine.

Alternatively or in addition, the ranking may include other turbine operational data such as for example tower vibration data, component health data and/or key indicators related thereof (such as pitch life) and/or may include loads on the turbine, standard deviation of wind speed, proximity to noise-sensitive areas, turbine warning messages, etc.

In some embodiments the method further comprises: when the total power of the pre-shutdown pool is above the allowed power drop, determining an actual rate of change of power resulting from a shutdown of the wind turbine in the pre-shutdown pool with the highest shutdown ranking score and shutting down 114 the wind turbine in the pre-shutdown pool with the highest shutdown ranking score if the actual rate of change of the power resulting from the shutdown does not exceed an allowed rate of change and if the highest wind speed within the pre-shutdown pool and the total power of the pre-shutdown pool satisfy/match a progressive shutdown condition;

wherein the allowed rate of change is based on the predetermined upper bound of the absolute value of the time derivative of the total power generated by the wind park.

For example, the allowed rate of change may be 25% of the maximum power value of the wind park per minute.

In some embodiments, the method further comprises: waiting 112 for a predetermined time delay after shutting down the wind turbine with the highest shutdown ranking score.

In some embodiments, the method further comprises:
determining 118 an idling pool of the wind park that includes wind turbines of the plurality of wind turbines that are stopped;
for each wind turbine in the idling pool, determining a second set of quantities of the wind turbine, the second set of quantities including at least a possible power of the wind turbine;
based on the second set of quantities determined for each wind turbine in the idling pool, computing 120 a total possible power of the idling pool;
controlling the wind turbines of the idling pool of the wind park based on the total possible power of the idling pool.

In some embodiments, the method further comprises determining a lowest average wind speed value within the idling pool.

In some embodiments, when the lowest average wind speed value is below a re-start wind speed a total turbine possible power within the idling pool is determined and, when the total turbine possible power is below an allowed power increase, the wind turbines in the idling pool are allowed 124 to restart.

In some embodiments, the method further comprises determining 126 a wind turbine with a highest re-start ranking score within the idling pool.

For example, the re-start ranking score may be calculated based on a startup factor, for example $$(P_{possible}/P_{rated})*t_{stopped}$$

where $P_{possible}$ indicates a possible power as the power that the turbine is theoretically/nominally able to produce based on a learned power curve and current operating conditions or operating modes. The re-start ranking allows a restart of turbines that are closer to reaching their rated power and have been stopped for a longer period than other turbines. $P_{rated}$ indicates a rated/nominal/theoretical power and $t_{stopped}$ a time interval in which the turbine was stopped.

Alternatively, or in addition, other embodiments of the re-start ranking might include indicators similar to those mentioned for the shutdown ranking, including turbine health and other turbine level feedbacks. For example, the restart ranking may be based or further based on the operational feedback of other turbines such as tower vibrations, component health or key indicators thereof such as pitch life, loads on the turbine, standard deviation of wind speed, proximity to noise-sensitive areas, turbine warning messages, etc.

In some embodiments, when the total turbine possible power within the idling pool is above an allowed power increase, the turbine with the highest re-start ranking score is allowed 124 to restart.

In some embodiments, the methods further comprise waiting 122 for a predetermined time delay after re-starting the wind turbine with the highest re-start ranking.

In some embodiments, the progressive shutdown condition is satisfied when the total power of the pre-shutdown pool is above an upper predefined power threshold and the highest wind speed is above a lower predefined wind speed threshold or when the wind speed is above an upper predefined wind speed threshold and the total power of the pre-shutdown pool is below the upper predefined power threshold and above a lower predefined power threshold, in particular a lower predefined threshold that is greater or equal than the allowed power drop.

The present disclosure further provides a wind park comprising a controller configured to carry out the methods of the present disclosure.

Figure 2:
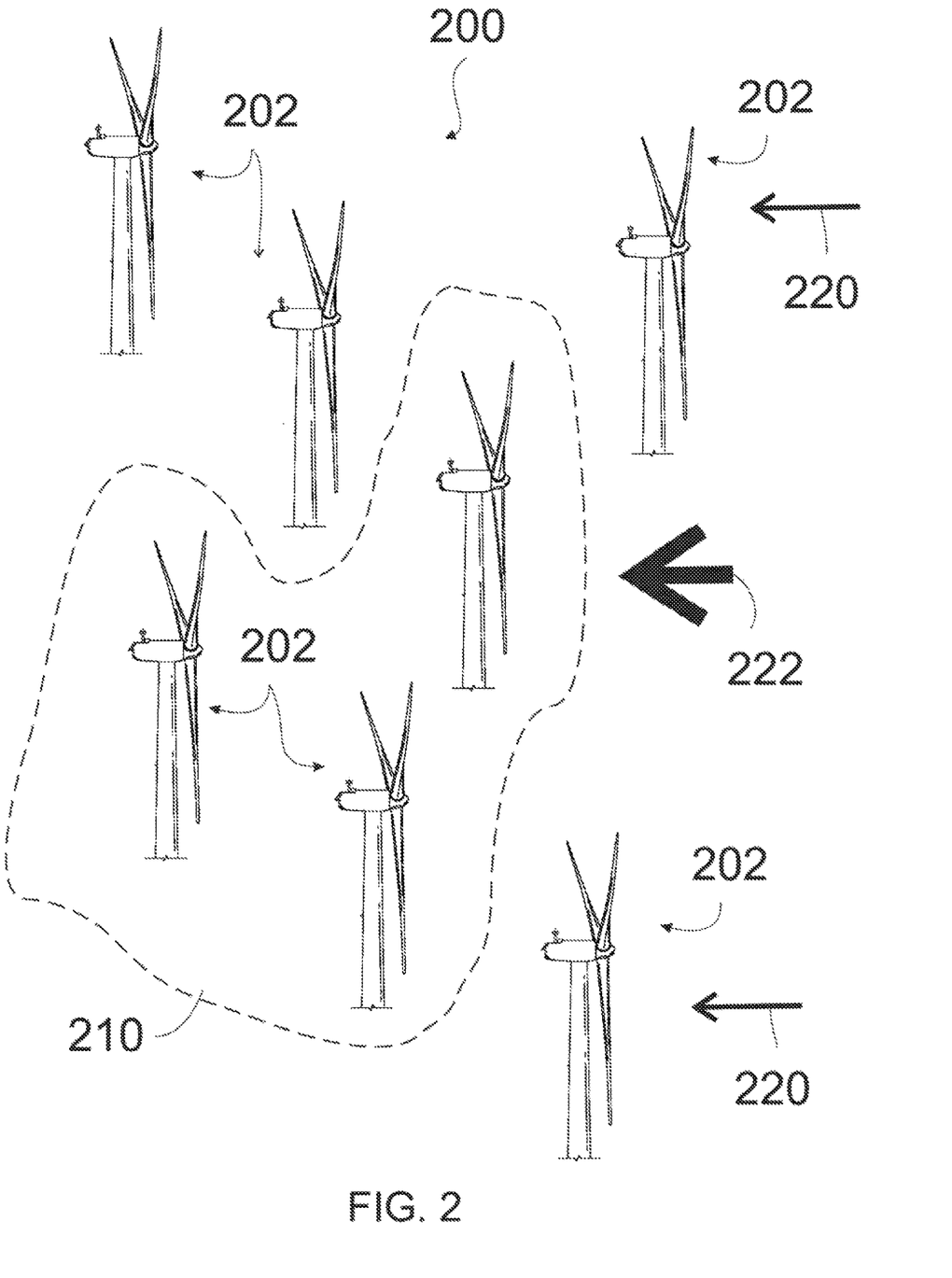
FIG. 2 shows a wind park with a plurality of wind turbines according to the present disclosure.

FIG. 2 shows a wind park with 200 a plurality of wind turbines 202 according to the present disclosure.

For each wind turbine 202, a first set of quantities of the wind turbine 202 is measured and/or determined, the first set of quantities including at least an average wind speed value at the wind turbine. The average wind speed value at the wind turbine may vary. For example, at some wind turbines the average wind speed may be a low wind speed 220, whereas at some other wind turbines the average wind speed may be a high wind speed 222.

The average wind speed may be a 10 minute average over time.

A pre-shutdown pool 210 is then determined that includes wind turbines of the generating pool for which the average wind speed value at the wind turbine exceeds a first wind speed threshold.

Figure 3:
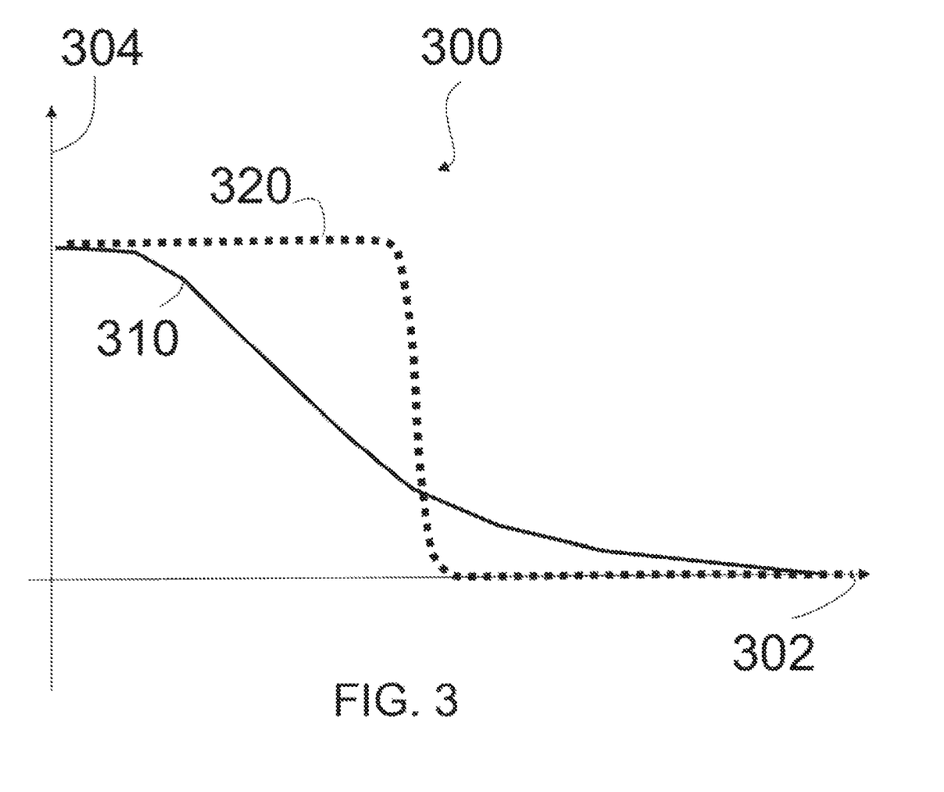
FIG. 3 shows an example of the total power generated by a wind park according to the present disclosure in comparison to the total power generated by a conventional wind park.

FIG. 3 shows an example of the total power 310 generated by a wind park according to the present disclosure in comparison to the total power 320 generated by a conventional wind park.

FIG. 3 shows on the abscissa 302 the time and on the ordinate 304 the total power generated by a wind park, i.e. FIG. 3 shows a graph 300 of the total power generated by a wind park as a function of time.

In a conventional wind park the total power of the wind park as a function of time may be for example correspond to the graph/curve 320. In the presence of a storm, a storm shutdown of the conventional wind park may cause a rapid drop of the power towards zero, as depicted by the graph/curve 320 that shows an absolute value of the time derivative of the total power generated by the conventional wind park that may present a very high value, corresponding to a very rapid drop to zero of the total power generated by the conventional wind park according to the graph/curve 320.

According to the present disclosure, the total power generated by the wind park 200 as a function of time may correspond to the graph/curve 310 showing an example of the total power generated by a wind park as a function of time according to the present disclosure, wherein the absolute value of the time derivative of the total power generated by the wind park according to the present disclosure remains below a predetermined upper bound.

The graph/curve 310 of the total power generated by the wind park as a function of time according to the present disclosure does not rapidly drop to zero or to a low value such that grid stability and reliable operation are maintained.

In contrast the graph/curve 310 of the total power generated by the conventional wind park may result in the instability of the grid and/or in an unreliable operation of the wind park due to the sudden drop of the power where the absolute value of the time derivative of the total power generated by the conventional wind park exceeds a predetermined upper bound resulting in instability.

Methods of the present disclosure include:
  determining a generating pool of the wind park 200 that includes wind turbines of the plurality of wind turbines 202 that are online;
  for each wind turbine in the generating pool, measuring and/or determining a first set of quantities of the wind turbine, the first set of quantities including at least an average wind speed value at the wind turbine, for example the wind speeds 220 and/or 222;
  based on the first set of quantities measured and/or determined for each wind turbine in the generating pool, determining a pre-shutdown pool 210 that includes wind turbines of the generating pool for which the average wind speed value at the wind turbine exceeds a first wind speed threshold;
  for each wind turbine in the pre-shutdown pool 210, measuring or determining a power of the wind turbine;
  based on the power of the wind turbines in the pre-shutdown pool, computing a total power of the pre-shutdown pool;
  controlling the wind turbines of the generating pool of the wind park based on the total power of the pre-shutdown pool;
  controlling the ramp rate of the wind park based at least in part on controlling the wind turbines of the generating pool of the wind park;
  wherein the controlling of the wind turbines of the generating pool is configured to limit and/or reduce the absolute value of the time derivative of the total power generated by the wind park 200 below a predetermined upper bound of the absolute value of the time derivative of the total power generated by the wind park and wherein, for example, the total power generated by the wind park 200 as a function of time according to the present disclosure follows a graph/curve 310 that is less steep than for example the graph/curve 320 of the total power generated by a corresponding conventional wind park as a function of time.

The present disclosure further discloses a method for controlling a wind park with a plurality of wind turbines, the method comprising:
  determining a set of online turbines of the wind park that includes wind turbines of the plurality of wind turbines that are online;
  for each wind turbine in the set of online turbines, measuring and/or determining a first set of quantities of the wind turbine, the first set of quantities including at least an average wind speed value at the wind turbine;
  based on the first set of quantities measured and/or determined for each wind turbine in the set of online turbines, determining a set of first threshold wind turbines that includes wind turbines of the set of online turbines for which the average wind speed value at the wind turbine exceeds a first wind speed threshold;
  for each wind turbine in the set of first threshold wind turbines, measuring or determining a power of the wind turbine;
  based on the power of the wind turbines in the set of first threshold wind turbines, computing a total power of the set of first threshold wind turbines;
  controlling the wind turbines of the set of online turbines of the wind park based at least in part on the total power of the set of first threshold wind turbines;
  controlling the wind turbines of the set of online turbines of the wind park;
  wherein the controlling of the wind turbines of the set of online turbines is configured to limit and/or reduce the absolute value of the time derivative of the total power generated by the wind park below a predetermined upper bound of the absolute value of the time derivative of the total power generated by the wind park.

In some embodiment, controlling the wind turbines of the set of online turbines further comprises controlling the wind turbines of the set of online turbines using a turbine-level storm shutdown logic when the total power of the set of first threshold wind turbines is below an allowed power drop.

In some embodiment, controlling the wind turbines of the set of online turbines further comprises:

determining if the total power of the set of first threshold wind turbines is above an allowed power drop and, when the total power of the set of first threshold wind turbines is above the allowed power drop, determining a highest wind speed within the set of first threshold wind turbines and, based on the total power of the set of first threshold wind turbines and the highest wind speed within the set of first threshold wind turbines, determining a shutdown ranking score for each wind turbine in the set of first threshold wind turbines and determining the turbine in the set of first threshold wind turbines with the highest shutdown ranking score;

wherein the allowed power drop is based on the predetermined upper bound of the absolute value of the time derivative of the total power generated by the wind park.

In some embodiment, the method further comprises:

when the total power of the set of first threshold wind turbines is above the allowed power drop, determining an actual rate of change of power resulting from a shutdown of the wind turbine in the set of first threshold wind turbines with the highest shutdown ranking score and shutting down the wind turbine in the set of first threshold wind turbines with the highest shutdown ranking score if the actual rate of change of the power resulting from the shutdown does not exceed an allowed rate of change and if the highest wind speed within the set of first threshold wind turbines and the total power of the set of first threshold wind turbines satisfy a progressive shutdown condition;

wherein the allowed rate of change is based on the predetermined upper bound of the absolute value of the time derivative of the total power generated by the wind park.

In some embodiment, the method further comprising waiting for a predetermined time delay after shutting down the wind turbine with the highest shutdown ranking score.

In some embodiment, the method further comprises:
determining an set of idle wind turbines of the wind park that includes wind turbines of the plurality of wind turbines that are stopped;
for each wind turbine in the set of idle wind turbines, determining a second set of quantities of the wind turbine, the second set of quantities including at least a possible power of the wind turbine;
based on the second set of quantities determined for each wind turbine in the set of idle wind turbines, computing a total possible power of the set of idle wind turbines;
controlling the wind turbines of the set of idle wind turbines of the wind park based on the total possible power of the set of idle wind turbines.

In some embodiment the method further comprises: determining a lowest average wind speed value within the set of idle wind turbines.

In some embodiment, when the lowest average wind speed value is below a re-start wind speed a total turbine possible power within the set of idle wind turbines is determined and, when the total turbine possible power is below an allowed power increase, the wind turbines in the set of idle wind turbines are allowed to restart.

Some embodiment further comprises determining a wind turbine with a highest re-start ranking score within the set of idle wind turbines.

In some embodiments, when the total turbine possible power within the set of idle wind turbines is above an allowed power increase, the turbine with the highest re-start ranking score is allowed to restart.

Some embodiments further comprise waiting for a predetermined time delay after re-starting the wind turbine with the highest re-start ranking.

In some embodiments, the progressive shutdown condition is satisfied when the total power of the set of first threshold wind turbines is above an upper predefined power threshold and the highest wind speed is above a lower predefined wind speed threshold or when the wind speed is above an upper predefined wind speed threshold and the total power of the set of first threshold wind turbines is below the upper predefined power threshold and above a lower predefined power threshold, in particular a lower predefined threshold that is greater or equal than the allowed power drop.

In some embodiments, the progressive shutdown condition is satisfied when:

the total power P of the set of first threshold wind turbines is above a predefined power threshold, for example 50% of a predefined maximum power value of the wind park, and the highest wind speed within the set of first threshold wind turbines is above a third wind speed threshold, for example 23.5 m/s; or the total power P of the set of first threshold wind turbines is greater than the allowed power drop, for example 25% of the predefined maximum power value of the wind park, and less than the predefined power threshold, for example 50% of the predefined maximum power value of the wind park, and the highest wind speed within the set of first threshold wind turbines is above a second wind speed threshold, for example 24 m/s;

and wherein the wind speeds are average wind speeds, for example 10 minute averages.

The present disclosure further discloses a wind park comprising a controller configured to carry out the methods of the present disclosure.

For example, the generating pool may be the set of online turbines.

For example, the pre-shutdown pool may be the set of first threshold wind turbines.

For example, the idling pool may be the set of idle wind turbines.

For example, a controlling of a wind park is configured to provide a ramp rate of the wind park based at least in part on controlling the wind turbines in the set of online turbines.

The invention claimed is:

1. A method for controlling a ramp rate of a wind park, the wind park having a plurality of wind turbines, the method comprising:
   determining a generating pool that includes wind turbines of the plurality of wind turbines that are online;
   for each wind turbine in the generating pool, determining a first set of quantities that includes at least an average wind speed value at the wind turbine;
   based on the first set of quantities, determining a pre-shutdown pool that includes wind turbines of the generating pool for which the average wind speed value exceeds a first wind speed threshold;
   for each wind turbine in the pre-shutdown pool, determining a power of the wind turbine;
   based on the power of the wind turbines in the pre-shutdown pool, computing a total power of the pre-shutdown pool;
   controlling the wind turbines of the generating pool based on the total power of the pre-shutdown pool;
   controlling the ramp rate of the wind park based on controlling the wind turbines of the generating pool;

wherein the controlling of the wind turbines of the generating pool is configured to reduce an absolute value of a time derivative of the total power of the pre-shutdown pool below a predetermined upper bound of the absolute value of the time derivative;

and wherein controlling the wind turbines of the generating pool further comprises:

determining if the total power of the pre-shutdown pool is above an allowed power drop and, when the total power of the pre-shutdown pool is above the allowed power drop, determining a highest wind speed within the pre-shutdown pool and, based on the total power of the pre-shutdown pool and the highest wind speed within the pre-shutdown pool, determining a shutdown ranking score for each wind turbine in the pre-shutdown pool and determining the turbine in the pre-shutdown pool with the highest shutdown ranking score;

wherein the allowed power drop is based on the predetermined upper bound of the absolute value of the time derivative;

and the method further comprising:

when the total power of the pre-shutdown pool is above the allowed power drop, determining an actual rate of change of power resulting from a shutdown of the wind turbine in the pre-shutdown pool with the highest shutdown ranking score and shutting down the wind turbine in the pre-shutdown pool with the highest shutdown ranking score when the actual rate of change of the power resulting from the shutdown does not exceed an allowed rate of change and when the highest wind speed within the pre-shutdown pool and the total power of the pre-shutdown pool satisfy a shutdown condition;

wherein the allowed rate of change is based on the predetermined upper bound of the absolute value of the time derivative of the total power generated by the wind park; and further comprising waiting for a predetermined time delay after shutting down the wind turbine with the highest shutdown ranking score.

2. The method of claim 1, wherein the controlling the wind turbines of the generating pool further comprises using a turbine-level storm shutdown logic when the total power of the pre-shutdown pool is below the allowed power drop.

3. The method of claim 1, further comprising:

determining an idling pool that includes wind turbines of the plurality of wind turbines that are stopped;

for each wind turbine in the idling pool, determining a second set of quantities that includes a possible power of the wind turbine;

based on the second set of quantities, computing a total possible power of the idling pool; and controlling the wind turbines of the idling pool of the wind park based on the total possible power of the idling pool.

4. The method of claim 3, further comprising determining a lowest average wind speed value within the idling pool.

5. The method of claim 4, wherein when the lowest average wind speed value is below a re-start wind speed and the total turbine possible power is below an allowed power increase, the wind turbines in the idling pool are allowed to restart.

6. The method of claim 5, further comprising determining a wind turbine with a highest re-start ranking score within the idling pool.

7. The method of claim 6, wherein when the total turbine possible power within the idling pool is above an allowed power increase, the turbine with the highest re-start ranking score is allowed to restart.

8. The method of claim 7, further comprising waiting for a predetermined time delay after re-starting the wind turbine within the idling pool with the highest re-start ranking.

9. The method of claim 1, wherein the shutdown condition is satisfied under one of the following:

when the total power of the pre-shutdown pool is above an upper predefined power threshold and the highest wind speed within the pre-shutdown pool is above a lower predefined wind speed threshold; or when the wind speed is above an upper predefined wind speed threshold and the total power of the pre-shutdown pool is below the upper predefined power threshold and above a lower predefined power threshold.

10. The method of claim 9, wherein the shutdown condition is satisfied under one of the following:

the total power of the pre-shutdown pool is above a predefined power threshold and the highest wind speed within the pre-shutdown pool is above a first predefined wind speed threshold; or the total power of the pre-shutdown pool is greater than the allowed power drop and less than the predefined power threshold, and the highest wind speed within the pre-shutdown pool is above a second wind speed threshold;

and wherein the wind speeds are average wind speeds.

11. A wind park comprising a controller configured to carry out the method according to claim 1.

* * * * *